United States Patent
Pachnicke (10) Patent No.: US 10,367,597 B2
(45) Date of Patent: Jul. 30, 2019

(54) METHOD AND CENTRAL NETWORK DEVICE FOR ESTABLISHING AN EMBEDDED OPTICAL COMMUNICATION CHANNEL IN AN OPTICAL WDM TRANSMISSION SYSTEM

(71) Applicant: ADVA Optical Networking SE, Meiningen (DE)

(72) Inventor: Stephan Pachnicke, Dortmund (DE)

(73) Assignee: ADVA Optical Networking SE, Meiningen (DE)

( * ) Notice: Subject to any disclaimer, the term of this patent is extended or adjusted under 35 U.S.C. 154(b) by 1 day.

(21) Appl. No.: 15/636,956

(22) Filed: Jun. 29, 2017

(65) Prior Publication Data

US 2018/0013513 A1 Jan. 11, 2018

(30) Foreign Application Priority Data

Jul. 7, 2016 (EP) .................................. 16178491

(51) Int. Cl.
*H04J 14/02* (2006.01)
*H04Q 11/00* (2006.01)

(52) U.S. Cl.
CPC ...... *H04J 14/0256* (2013.01); *H04J 14/0276* (2013.01); *H04Q 11/0066* (2013.01); *H04Q 2011/0016* (2013.01); *H04Q 2011/0086* (2013.01)

(58) Field of Classification Search
CPC ............. H04J 14/0256; H04J 14/0276; H04Q 11/0066; H04Q 2011/0016; H04Q 2011/0086

USPC .................................................... 398/45–54
See application file for complete search history.

(56) References Cited

U.S. PATENT DOCUMENTS

| | | | | |
|---|---|---|---|---|
| 7,068,949 B2* | 6/2006 | Jung | ................... | H04B 10/506 372/29.011 |
| 7,421,199 B2 | 9/2008 | Bai | | |
| 8,306,419 B2* | 11/2012 | Luk | .................... | H04B 10/2587 398/195 |
| 8,396,361 B2* | 3/2013 | Grobe | .................... | H04J 3/085 398/12 |
| 8,798,469 B2* | 8/2014 | Grobe | ................ | H04B 10/2916 398/70 |

(Continued)

FOREIGN PATENT DOCUMENTS

| EP | 2642676 A1 | 9/2013 |
|---|---|---|
| EP | 2773056 A1 | 9/2014 |
| EP | 2999151 A1 | 3/2016 |

*Primary Examiner* — Amritbir K Sandhu
(74) *Attorney, Agent, or Firm* — The Webb Law Firm (57) ABSTRACT

A method for establishing an embedded optical communication channel in an optical WDM transmission system including: creating, at the central network device, a broadband optical signal, supplying the broadband optical signal, transmitting the broadband optical signal and the plurality of second optical channel signals to an optical demultiplexer device, transmitting an optical signal consisting of a dedicated second optical channel signal and a filtered broadband optical signal; receiving the optical signal and creating a corresponding electrical receive signal and extracting the electrical signal corresponding to the filtered broadband optical signal from the electrical receive signal and detecting whether the electrical signal contains information intended for the respective first channel transceiver.

17 Claims, 3 Drawing Sheets

(56) References Cited

U.S. PATENT DOCUMENTS

| | | | |
|---|---|---|---|
| 9,231,724 B2 | 1/2016 | Pachnicke et al. | |
| 9,294,192 B2 * | 3/2016 | Eiselt | H04B 10/2575 |
| 9,294,215 B2 * | 3/2016 | Grobe | H04J 14/0221 |
| 9,344,213 B2 | 5/2016 | Eiselt et al. | |
| 9,806,843 B2 * | 10/2017 | Eiselt | H04J 14/0227 |
| 9,813,184 B2 * | 11/2017 | Lawin | H04Q 11/0066 |
| 2004/0005150 A1 * | 1/2004 | Takeshita | H04B 10/00 |
| | | | 398/32 |
| 2006/0153566 A1 * | 7/2006 | Sorin | H04J 14/02 |
| | | | 398/72 |
| 2006/0291776 A1 * | 12/2006 | Lee | H04J 14/02 |
| | | | 385/24 |
| 2007/0036483 A1 * | 2/2007 | Shin | H04J 14/02 |
| | | | 385/24 |
| 2013/0064542 A1 * | 3/2013 | Eiselt | H01S 5/0687 |
| | | | 398/34 |
| 2013/0251364 A1 * | 9/2013 | Pachnicke | H04J 14/0227 |
| | | | 398/32 |
| 2016/0087749 A1 | 3/2016 | Lawin et al. | |

\* cited by examiner

METHOD AND CENTRAL NETWORK DEVICE FOR ESTABLISHING AN EMBEDDED OPTICAL COMMUNICATION CHANNEL IN AN OPTICAL WDM TRANSMISSION SYSTEM

CROSS-REFERENCE TO RELATED APPLICATION

This application claims priority to European Patent Application No. 16 178 491.3 filed Jul. 7, 2016, the disclosure of which is hereby incorporated in its entirety by reference.

BACKGROUND OF THE INVENTION

Field of the Invention

The invention relates to a method for establishing an embedded optical communication channel in an optical wavelength division multiplex (WDM) transmission system as well as to a network device configured to implement this method and to a respective optical WDM transmission system.

Description of Related Art

An optical WDM transmission system generally comprises a plurality of first channel transceivers at a first end of a bidirectional optical WDM transmission path, a plurality of second channel transceivers at a second end of the optical WDM transmission path, each first channel transceiver being configured to create and transmit a first optical channel signal, in a respective downstream channel, to the second end of the optical WDM transmission path and to receive a second optical channel signal created by a second channel transceiver and each second channel transceiver being configured to create and transmit a second optical channel signal, in a respective upstream channel, to the first end of the optical WDM transmission path and to receive a first optical channel signal created by a first channel transceiver.

In addition to the optical transmission links which are established between pairs of dedicated first and second channel transceivers (of course, broadcasting links between a first and a plurality of second channel transceivers or vice versa are possible, too) and which are provided for transmitting the (usually high bit rate) wanted optical signals or line data signals, an optical WDM transmission system may require to transmit additional control information, for example information that is necessary to control the wavelength and/or optical power of the optical sources, such as tunable lasers.

Such control information may be transmitted by providing separate control channels using separate transmission paths or by means of so-called embedded communication channels (ECC), which can be operated in-band or out-of-band of the optical transmission links for the wanted optical signals. That is, the information transported in the ECC uses the same optical transmission path as the wanted optical signals.

It is known to modulate the amplitude of a wanted (high bit rate) signal in the electrical domain according to a low-frequency or low bit rate control signal before converting this combined signal into an optical signal that includes an ECC for transporting the control information included in the control signal in addition to the optical channel signal. That is, the modulation depth of the optical channel signal is varied according to the low-frequency control signal (see e.g. U.S. Pat. No. 7,421,199 B2).

If one or more ECCs are used in order to control the wavelength of a plurality of tunable optical sources, for example tunable optical lasers that are provided within respective channel transceivers comprised by an optical line terminal (OLT), a centralized wavelength control may be implemented using a separate (stand-alone) device. In the European patent application EP 2 773 056 A1, the applicant disclosed a method for tuning a tunable optical transmitter in an optical WDM transmission system using a central or stand-alone network device, which is configured to extract, from a downstream optical WDM signal, control information that is included in one or more downstream ECC channels realized by amplitude-modulating a respective optical downstream channel signal. The upstream ECC channels are realized by modulating the upstream optical WDM signal according to one or more low-frequency sub-carriers (pilot tones), which are modulated according to a respective (even lower-frequency) control signal including the control information to be transmitted in the upstream direction.

However, this method for realizing an upstream or downstream ECC requires the presence of an upstream optical WDM signal, i.e. at least one upstream channel signal. This, however, cannot be guaranteed in all circumstances.

It is thus an object of the present invention to provide a method for establishing an embedded communication channel (ECC) in an optical WDM transmission system as well as a network device configured to implement this method and a respective optical WDM transmission system, wherein no optical WDM signal is required in order to establish the ECC and wherein the ECC between the network device and one or more channel transceivers at a respective end of the WDM transmission path can be implemented in an easy and cost-efficient way.

SUMMARY OF THE INVENTION

According to the present invention, an ECC is created between a central network device that is connected, at a predetermined position, to a WDM transmission path, which connects first channel transceivers provided at a first end and second optical channel transceivers provided at a second end of the WDM transmission path, and a selected one or all of the first channel transceivers.

In the following description, the transmission direction from the central network device (or the second channel transceivers) to the first channel transceivers is arbitrarily referred to as upstream direction whereas the transmission direction from the first channel transceivers to the central network device (or the second channel transceivers) is referred to as downstream direction.

In order to establish the ECC, a broadband optical signal having an optical spectrum which covers at least a group of neighboring or all optical upstream channels of the optical WDM transmission system is created at the central network device. The optical power of the broadband optical signal is modulated according to a low-frequency modulation signal in such a way that there is no or no unacceptable spectral overlap of the low-frequency spectrum of the modulation component, i.e. the low-frequency spectrum of the low-frequency modulation signal, and of any of the modulation baseband spectra of the second optical channel signals, which are created by the second channel transceivers and included in an upstream optical WDM signal. The modulation baseband spectrum of a second optical channel signal is the spectrum of the (high frequency/high bit rate) modulation signal that is used to modulate the optical carrier signal for creating the second optical channel signal. The amplitude-modulated broadband optical signal is supplied, at the position of the central network device, to the optical WDM transmission path in the direction of the first channel transceivers.

As the spectra of the low-frequency modulation signal and the baseband spectra of the high-frequency modulation components included in the second optical channel signals do not overlap, it is possible to separate these low- and high-frequency components easily in the electrical domain after having received the respective optical signals at the first channel transceivers.

The upstream optical channel signals created by the second channel transceivers are demultiplexed at the first end of the optical WDM transmission path by an optical demultiplexer device, which is connected to the first end of the optical WDM transmission path and which optically filters and spatially separates the upstream optical channel signals according to the optical channels predefined for the optical WDM transmission system. In addition, the broadband optical signal is also (partially) transmitted through the optical demultiplexer device and output, at each channel port of the demultiplexer device, as a respectively filtered narrow-band optical signal, which still carries the full information included in the low-frequency modulation component of the broadband optical signal.

Thus, an optical signal consisting of a dedicated second optical channel signal, if any, and a respectively filtered broadband optical signal is transmitted from a respective channel port of the optical demultiplexer device to a dedicated first channel transceiver connected thereto. The first channel transceiver receives this optical signal and creates a corresponding electrical receive signal comprising a second electrical channel signal corresponding to the dedicated second optical channel signal and an electrical signal corresponding to the filtered broadband optical signal. This electrical signal, which includes the information included in the low-frequency modulation component of the broadband optical signal created at the central network device, can be extracted from the electrical receive signal by electrical (low-pass or bandpass) filtering.

In this way, one or more upstream ECCs between the central network device and the first channel transceivers can easily be established. Due to the use of a broadband optical source at the central network device, an ECC in each of the optical channels (and thus towards each of the respective dedicated first channel transceivers) can be established which is covered by the optical spectrum of the broadband optical signal.

Both the respective upstream channel signal created by the dedicated second channel transceiver and the filtered broadband optical signal are converted into an electrical receive signal by the same opto-electrical converter, for example a photodiode. No additional opto-electrical converter and no optical splitter are required in order to establish the ECC.

The broadband optical signal may be created as an in-band signal, that is the optical spectra of the filtered broadband optical signal and the respective upstream channel signal overlap. In an alternative, the optical channel defined for the optical WDM transmission system may comprise two or more optical bandwidths (or sub-channels). This can be realized by a cyclic optical filter or a cyclic optical demultiplexer device, for example a cyclic arrayed waveguide grating (cyclic AWG). In this way, the optical path between the WDM port of the optical demultiplexer device and the first channel transceiver connected to a dedicated channel port of the optical demultiplexer device can be used by two or more optical signals, each of which lies within a dedicated optical bandwidth of a sub-channel. The sub-channels are generally separated by an essentially constant frequency distance, for example the free spectral range of a cyclic AWG.

If the upstream channel signal and the respective filtered broadband optical signal use different sub-channels, no optical interference or interaction (especially due to nonlinear optical effects) occurs which may deteriorate the transmission quality of the respective (high bit rate) upstream channel signal.

According to an embodiment of the invention, the broadband optical signal is created by means of a broadband optical source, preferably comprising or consisting of an electro-optical converter such as a light emitting diode or a supercontinuum laser, wherein the electro-optical converter is preferably directly modulated. It would of course be possible to use a broadband optical source which produces cw light and to provide an external optical modulator configured to amplitude-modulate the optical power of the cw light.

The modulation depth of the broadband optical signal may be as high as 80% or more, preferably 100%. Thus, a low optical power (for example 0 dBm of the unfiltered broadband optical signal) may be sufficient for error-free detection of the optically filtered broadband optical signal at the respective first channel transceiver. Due to this low optical power of the influence (noise-like crosstalk) on the upstream channel signals is relatively low, even in case of using an in-band ECC.

According to a further embodiment, at least one of the plurality of first channel transceivers may comprise a tunable laser. A predetermined portion of the optical power of the respective at least one first optical channel signals may be split off at a predetermined position of the optical WDM transmission path. Control information included in the respective at least one first channel signal can be determined at the central network device and the broadband optical signal may be created in such a way that the control information and an address information are included in its low-frequency amplitude modulation component. In this way, tuning of the center wavelength and/or the optical power of the downstream optical channel signal created by the tunable laser can be effected.

The at least one first channel signal may comprise a low-frequency amplitude modulation component comprising a unique pilot tone assigned to the respective downstream optical channel of the optical WDM transmission system. In this way, information concerning certain properties of the respective first optical channel signal can be determined at the central network device. Especially, the amplitude of the pilot tone can be used as a measure for the optical power of the first optical channel signal. Further, the unique pilot tone may be used as a sub-carrier in order to transport analog or digital information from the respective first channel transceiver to the central network device within a downstream ECC.

The low-frequency amplitude modulation component of the broadband optical signal may be created by using, as a modulation signal for amplitude-modulating the broadband optical source, at least one unique pilot tone, which is modulated according to a digital signal carrying the information to be transmitted. The pilot tone frequency may lie within a range of e.g. 10 kHz to 100 MHz, preferably in a range of e.g. 100 kHz to 5 MHz.

The pilot tone frequency may be dedicated to a specific channel or first channel transceiver (or the receiver part thereof), respectively. Further, the pilot tone may be used as a sub-carrier for carrying analog or digital information by modulating the pilot tone in a suitable manner (e.g. using amplitude modulation or phase-/frequency modulation). A unique pilot tone may in this case be interpreted as address information by the first channel transceivers.

However, it is also possible to use a specific pilot tone which is interpreted as broadcast address for simultaneously receiving the information included in the upstream ECC realized by the broadband optical signal by a predetermined group or by all first channel transceivers.

Of course, no unacceptable overlap between the baseband spectrum of the modulation component of the broadband optical signal, i.e. the spectrum of the low-frequency modulation signal, which is the pilot tone frequency or spectrum of the modulated pilot tone, and the baseband spectrum of the (high frequency) modulation component included in the second or upstream channel signals should exist.

According to an embodiment of the invention, the low-frequency modulation component may consist of a modulated pilot tone, wherein the respective modulation signal is a digital modulation signal comprising address information, which is evaluated by the first channel transceivers, and further information, e.g. tuning or other control information, that is used or further processed by the channel transceiver addressed.

A central network device for implementing the method according to the invention comprises a suitable broadband optical source configured to create the modulated broadband optical signal, a controller configured to create and/or receive the low-frequency modulation signal and to supply same to the broadband optical source, and an optical combiner device configured to receive, at a first optical port, the second optical channel signals, if any, and at a second optical port, the modulated broadband optical signal, and to output, at a third optical port, the signals received at the first and second optical ports. That is, the optical combiner device is positioned within the optical transmission path of the upstream optical WDM signal at a predetermined position, wherein the first port is connected to an end of a partial optical WDM path between the second end of the optical WDM transmission path (connected to the second channel transceivers) and the position of the optical combiner device and wherein the second port is connected to an end of a further partial optical WDM path between the position of the optical combiner device and the first end of the optical WDM transmission path (connected to the first channel transceivers).

According to a further embodiment, the central network device may further comprise an opto-electrical converter configured to receive an optically filtered or unfiltered optical downstream WDM signal comprising the first optical channel signals and to convert the signal received into an electrical WDM signal and to supply the electrical WDM signal to the controller. In this case, the central network device may provide the function of a central tuning device, which determines tuning information from a selected first (or downstream) channel signal and transmits this tuning information to the respective first channel transceiver using the ECC realized by the broadband optical signal.

In such an embodiment, the controller may determine an embedded information included in at least one first electrical channel signal that corresponds to a respective first optical channel signal comprised in the optically filtered or unfiltered optical downstream WDM signal and create the low-frequency modulation signal in such a way that it includes the embedded information determined or an information that is determined by processing the embedded information. That is, the information included in the respective first optical channel signal may be included in a respective downstream ECC.

BRIEF DESCRIPTION OF THE DRAWINGS

Further objects and advantages of the present invention will become apparent from the following description of a preferred embodiment that is given by way of example with reference to the accompanying drawings, wherein.

DETAILED DESCRIPTION OF THE INVENTION

Figure 1:
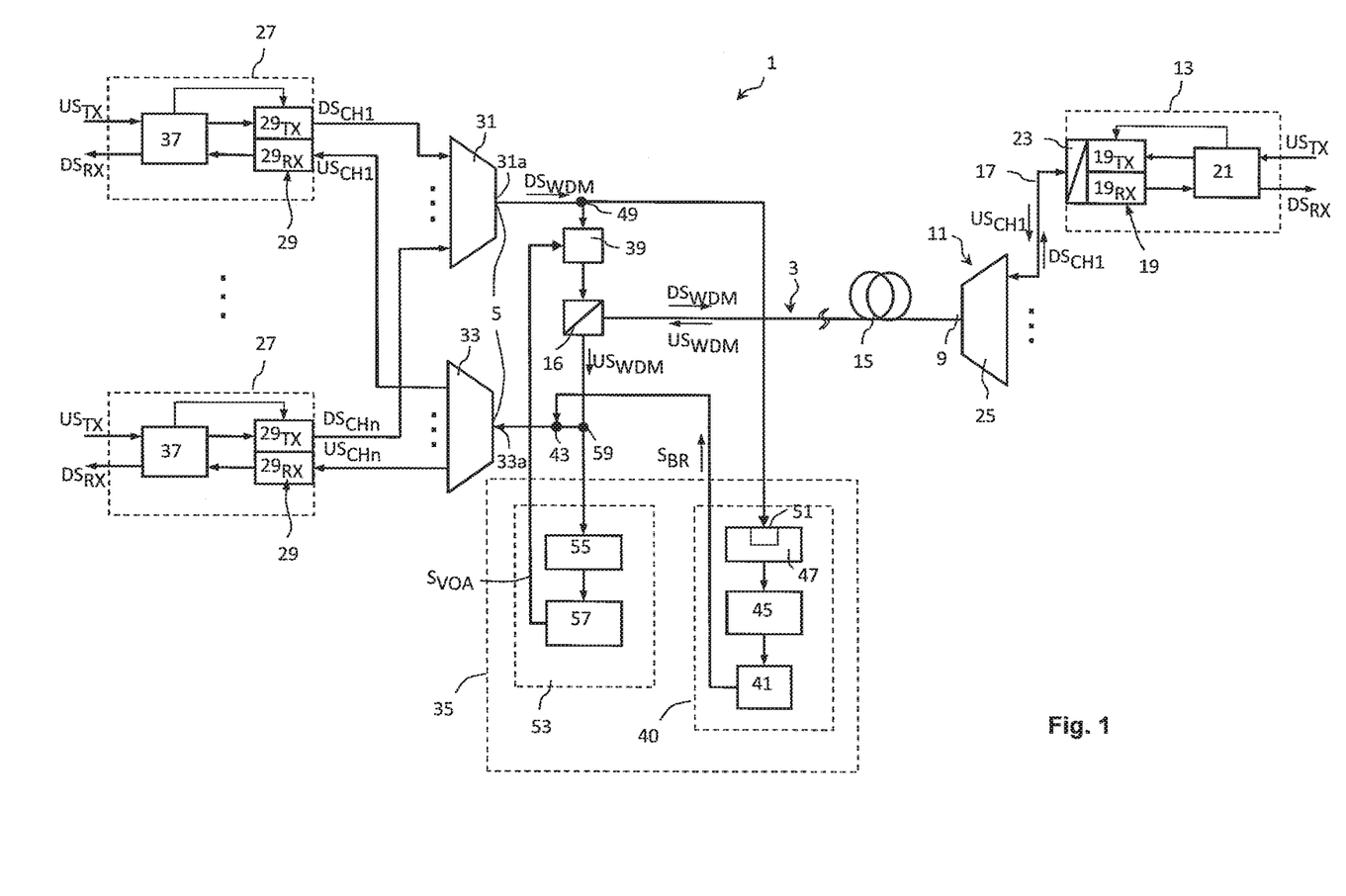
FIG. 1 shows a schematic block diagram of an optical WDM transmission system according to a first embodiment of the invention comprising a single-fiber optical WDM transmission path.

FIG. 1 shows an optical WDM transmission system 1 comprising an optical WDM transmission path 3 having a first end 5 connected to an optical line terminal (OLT) 7 and a second end 9 connected to a remote node 11, and a plurality of optical node units (ONU) 13 connected to the remote node 11.

In this embodiment of an optical WDM transmission system 1, the optical WDM transmission path 3 comprises a single optical fiber 15, which is used for transmitting the downstream optical WDM signal $DS_{WDM}$ and the upstream optical WDM signal $US_{WDM}$. As mentioned above, in this description, the direction from the OLT 7 to the ONUs 13 is designated as downstream direction and the opposite direction from the ONUs 13 to the OLT 7 is designated as upstream direction.

The optical WDM transmission path further comprises, at its first end 5, an optical separator/combiner means 16 for separating/combining the optical paths for the downstream and upstream optical WDM signals. The optical separator/combiner means 16 may be realized by an optical band filter 16, for example an optical diplexer, if different, non-overlapping optical bands are used for the downstream and upstream optical channels of the optical WDM transmission system 1. For example, the optical L-band may be used for the downstream optical channels and the optical C-band may be used for the upstream optical channels. It would of course also be possible to use the same optical bands for the downstream and upstream optical channels. In this case, an optical circulator can be used as optical separator/combiner means 16.

As apparent from FIG. 1, each ONU 13 is connected to a channel port of the remote node 11 by a single optical fiber 17 (also referred to as distribution fiber 17). That is, each fiber 17 is used to transmit an upstream optical channel signal $US_{Chi}$ (1≤i≤n) created by a transmitter unit $19_{TX}$ of a channel transceiver 19 comprised by each ONU 13 and a downstream optical channel signal $DS_{Chi}$ (1≤i≤n) to be received by a receiver unit $19_{RX}$ of the respective channel transceiver 19. For the sake of simplicity, FIG. 1 shows a first one of the plurality of n ONUs 13 only. Each ONU 13 further comprises a controller 21. The controller 21 is configured to receive and process an (electrical or, as the case may be, an optical) upstream transmit signal $US_{TX}$ to be transmitted in the upstream direction and to output a respective electrical signal to the transmitter unit $19_{TX}$. The controller 21 is further configured to receive a downstream electrical channel signal created by the receiver unit $19_{RX}$ through converting the respective downstream optical channel signal $DS_{Chi}$ and, if necessary, to further process the downstream electrical channel signal and to output a respective (electrical or, as the case may be, an optical) downstream receive signal $DS_{RX}$.

As will be explained below, each downstream optical channel signal $DS_{Chi}$ may include a downstream embedded communication channel (downstream ECC) and/or each upstream optical channel signal $US_{CH,i}$ may include an upstream embedded communication channel (upstream ECC), which are provided to establish a unidirectional or bidirectional communication between a central network device 35 and each (or at least one selected) ONU 13.

Each channel transceiver 19 comprises an optical separator/combiner means 23 for separating/combining the optical paths between an input port of the channel transceiver 19 (i.e. the ONU 13), which is connected to the distribution fiber 17, and the input port of the receiver unit $19_{RX}$ and the output port of the transmitter unit $19_{TX}$, respectively. If different (non-overlapping) optical bands are used for the downstream optical channels and upstream optical channels of the optical WDM transmission system 1, a wavelength-dependent optical band filter, for example an optical die diplexer, may be used as optical separator/combiner means 23. In this case, for example, the optical L-band may be used for the downstream optical channels and the optical C-band may be used for the upstream optical channels. If the same optical band is used for the upstream and the downstream optical channels, an optical circulator may be used as optical separator/combiner means 23.

Each transmitter unit $19_{RX}$ of a channel transceiver 19 comprised by each ONU 13 may include a tunable optical source, for example a tunable laser.

The remote node 11 realizes the function of demultiplexing the downstream optical channel signals $DS_{Chi}$ comprised by the downstream optical WDM signal that is received at a WDM port connected to the second end of the optical fiber 15 and outputting the downstream optical channel signals $DS_{Chi}$ at respective channel ports, wherein each channel port is connected to a dedicated distribution fiber 17. Further, the remote node 11 realizes the function of multiplexing the upstream optical channel signals $US_{CHi}$ received at the channel ports so as to create the upstream optical WDM signal $US_{WDM}$, which is output at the WDM port. In case of a single fiber WDM transmission path 3, the remote node 11 may be realized by means of a single AWG 25, which acts as a wavelength-dependent and spatial filter.

The OLT 7 comprises a plurality of n receiver and transmitter devices 27. Each of these receiver and transmitter devices 27 comprises a channel transceiver 29 including a transmitter unit $29_{TX}$ configured to create one of the downstream optical channel signals $DS_{Chi}$ and a receiver unit $29_{TX}$ configured to receive one of the upstream optical channel signals $US_{Chi}$. The OLT 7 further comprises an optical multiplexer 31 and an optical demultiplexer 33.

Each transmitter unit $29_{TX}$ is connected, at an output port thereof, to an optical path, for example an optical fiber, which connects the output port to a dedicated channel port of the optical multiplexer 31. The optical multiplexer 31 is configured to combine the downstream optical channel signals $DS_{Chi}$ to the downstream optical WDM signal $DS_{WDM}$. The downstream optical WDM signal $DS_{WDM}$ is output at a WDM port 31a of the optical multiplexer 31. The WDM port 31a is connected, via a variable optical attenuator (VOA) 39, to a downstream port of the optical separator/combiner means 16. An upstream port of the optical separator/combiner means 16 is connected to a WDM port of the optical demultiplexer 33. A WDM port of the optical separator/combiner means 16 is connected to the optical fiber 15, which realizes a bidirectional optical path for the downstream and upstream optical WDM signals $DS_{WDM}$, $US_{WDM}$. The optical path between the WDM port 31a of the optical multiplexer 31 and the downstream port of the optical separator/combiner means 16 merely guides the downstream optical WDM signal $DS_{WDM}$, and the optical path between the upstream port of the optical separator/combiner means 16 and a WDM port 33a of optical demultiplexer 33 merely guides the upstream optical WDM signal $US_{WDM}$.

Each receiver unit $29_{RX}$ of the receiver and transmitter devices 27 is connected, at an input port thereof, to a dedicated channel port of the optical demultiplexer 33 by an optical path, for example an optical fiber. The optical demultiplexer 33 is configured to receive, at the WDM port, the upstream optical WDM signal $US_{WDM}$ and to demultiplex this signal into the single upstream optical channel signals $US_{Chi}$. Each of the upstream optical channel signals $US_{Chi}$ is output at a respective dedicated channel port and supplied to the respective receiver unit $29_{RX}$.

Each receiver and transmitter device 27 further comprises a controller 37. The controller 37 is configured to receive and further process (if desired) an electrical signal from the receiver unit $29_{RX}$, which corresponds to the upstream optical channel signal $US_{Chi}$ that has been received and opto-electrically converted by the receiver unit $29_{RX}$. The controller 37 outputs the electrical signal received and (if desired) processed as an (electrical or optical) upstream receive signal $US_{RX}$. The controller 37 is further configured to create or receive a downstream transmit signal $DS_{TX}$ (which may again be an electrical or optical signal) comprising the information to be transmitted into the downstream direction. The controller 37 processes this signal, if required, and transmits the signal processed to the transmitter unit $29_{TX}$ of the channel transceiver 29. The transmitter unit $29_{TX}$ converts the signal received from the controller 37 into the respective downstream optical channel signal $DS_{Chi}$.

It shall be noted that in the system shown in FIG. 1 (and also in the system shown in FIG. 2) the downstream and upstream optical channel signals $DS_{Ch1}$, $US_{Ch1}$ are created at wavelengths in such a way that, according to the routing properties of the optical multiplexer 31, the optical demultiplexer 33 and the remote node 11, an optical transmission link between the first receiver and transmitter device 27 and the first ONU 13 is established. Of course, if tunable optical sources, especially tunable optical lasers, are used in the respective transmitter units $19_{TX}$ and $29_{TX}$, the wavelength may be tuned in such a way that each of the ONUs 13 can communicate with any of the receiver and transmitter devices 27 of the OLT 7 and vice versa.

As will be explained below, all or at least one selected downstream optical channel signals $DS_{Chi}$ created by the transmitter units $29_{TX}$ may comprise a downstream ECC and/or all or at least one selected upstream optical channel signals $US_{Chi}$ received by the receiver units $29_{RX}$ may comprise an upstream ECC in order to establish a unidirectional or bidirectional communication between the OLT 7 (or one or more selected receiver and transmitter devices 27) and the central network device 35.

The central network device 35 comprises means 40 for establishing downstream and upstream ECCs between the OLT 7 or the receiver and transmitter devices 27, respectively, and the central network device 35. The central network device 35 comprises a broadband optical source 41, which is configured to create a broadband optical signal $S_{BR}$ having an optical spectrum covering at least a group, preferably all, of the optical upstream channels defined for the optical WDM transmission system 1. Of course, the optical upstream channels are especially defined by the optical filter properties of the remote node 11 (which may be realized as an AWG 25), the optical multiplexer 31 and the optical demultiplexer 33, which may both be realized as an AWG, too.

It shall be mentioned that an optical downstream or upstream channel may comprise a single channel or two or more sub-channels, wherein the two or more sub-channels are routed to the same ONU 13 or the same receiver and transmitter device 27, respectively. This property may, for example, be achieved by using (preferably identical) cyclic AWGs for realizing the remote node 11, the optical multiplexer 31 and the optical demultiplexer 33.

As apparent from FIG. 1, the broadband optical signal is supplied to the optical WDM transmission path 3 in the direction of the optical demultiplexer 33, that is, in the direction of the first end 5 thereof. This is achieved by using an optical combiner 43, for example a 2×1 optical splitter, which is configured to add the broadband optical signal $S_{BR}$ to the optical WDM transmission path in its upstream direction.

According to the embodiment shown in FIG. 1, the optical combiner 43 is inserted into the optical path between the upstream port of the optical separator/combiner means 16 and the WDM port 33a of the optical demultiplexer 33. In this way, the optical attenuation caused by the optical combiner 43 does not influence the downstream optical WDM signal $DS_{WDM}$. It would, however, also be possible to provide the optical combiner 43 within the portion of the optical WDM transmission path 3 that guides both the downstream optical WDM signal $DS_{WDM}$ and the upstream optical WDM signal $US_{WDM}$, that is within the optical fiber 15.

The broadband optical signal $S_{BR}$ may be provided within the same optical band that is used for the upstream optical WDM signal $US_{WDM}$ or within a (non-overlapping) different optical band comprising optical sub-channels that are not used by the upstream optical WDM signals $US_{WDM}$.

Due to the optical and spatial filter properties of the optical demultiplexer 33, the broadband optical signal $S_{BR}$ is optically filtered and the filtered broadband optical signal (having an optical bandwidth according to the band filter properties of the optical demultiplexer 33) is supplied to the dedicated receiver and transmitter device 27 together with the respective upstream optical channel signal $US_{CHi}$. That is, the respective group or all of the receiver and transmitter devices 27 of the OLT 7 receive a respectively filtered broadband optical signal $S_{BR}$ so that the information included therein can be extracted and processed at each of the receiver and transmitter devices 27.

Of course, the broadband optical signal $S_{BR}$ may be created in such a way that it includes address information in order to establish an upstream ECC between the central network device 35 and a selected one of the receiver and transmitter devices 27 of the OLT.

The central network device 35 comprises a controller 45, which is configured to control the broadband optical source 41 in such a way that the optical power of the broadband optical signal is modulated in its amplitude according to a modulation signal. The modulation signal may be created by the controller 45 according to an information to be transmitted by the ECC or directly received by the controller 45 from an external device (not shown). The (electrical) spectrum of the modulation signal (or the baseband spectrum of the modulation component of the optical spectrum of the modulated broadband optical signal) and the (electrical) spectrum of the modulation signals that are used to modulate the optical carrier in order to create the upstream optical channel signals $US_{Chi}$ (or the baseband spectrum of the modulation component of the optical spectrum of the upstream optical channel signals $US_{Chi}$) shall, of course, not overlap or only overlap to an acceptable extent (i.e. in such a manner that the respective signals may still be received by using direct detection and an electrical filter for separating the opto-electrically converted (combined) signal).

A simple and easy way to realize the broadband optical source 41 is to use an LED and to directly modulate the LED in order to create the broadband optical signal $S_{BR}$. Instead of an LED, a supercontinuum laser or any other appropriate optical source may be used. Instead of using direct modulation, an optical source creating cw radiation and an external optical modulator may be provided.

In this way, an upstream ECC between the central network device 35 and any arbitrary single or group of receiver and transmitter devices 27 of the OLT can be established. The central network device 35 and the optical combiner 43 may be provided at any arbitrary position within the optical WDM transmission path 3.

In order to address a selected receiver and transmitter device 27, the controller 45 may be configured to include address information in the modulation signal that is used for creating the amplitude-modulated broadband optical signal $S_{BR}$. For example, the modulation signal may comprise a pilot tone having a predetermined (sinusoidal or different) frequency. The pilot tone frequency, which may be within the range of a few kilohertz to several ten megahertz, may serve as an address information. In this case, a specific pilot tone frequency is assigned to each of the receiver and transmitter devices 27 or each of the receiver units $29_{RX}$ of the OLT channel transceivers 29, respectively.

It is, of course, also possible to assign a specific pilot tone frequency to a predetermined group or all receiver units $29_{RX}$, which may then serve as a broadcast address information.

The pilot tone may also serve as a sub-carrier, which is modulated according to a modulation signal, preferably a digital modulation signal, which includes information to be transmitted within the respective upstream ECC to the OLT 7. In this alternative, the modulation signal for modulating the pilot tone may also include address information that is evaluated at each receiver unit $29_{RX}$, that is, the upstream ECC may be realized as a time division multiplex channel for transmitting information from the central network device 25 to a specific receiver unit $29_{RX}$ or a specific channel transceiver 29, respectively.

In an alternative, more than one dedicated pilot tones serving as sub-carriers may be simultaneously transmitted using the broadband optical signal $S_{BR}$. Of course, the highest modulation frequency for modulating the sub-carriers must be lower than half the frequency distance of two neighboring subcarrier frequencies.

As already briefly mentioned above, the combined optical signal that is received at an input port of an optical receiver unit $29_{RX}$ is converted into an electrical receive signal using the same opto-electrical converter, for example a photodiode. The electrical receive signal, which comprises an electrical channel signal dedicated to the respective receiver and transmitter device 27 and an upstream electrical ECC signal corresponding to the optically filtered broadband optical signal $S_{BR}$, can be electrically sintered in order to separate the upstream electrical channel signal and the upstream electrical ECC signal. For example, the electrical receive signal may be supplied to an electrical low-pass filter for extracting the upstream electrical ECC signal from the electrical receive signal.

Of course, any type of electrical filter may be used which makes it possible to extract the upstream ECC signal, including any type of analog or digital filter. If the pilot tone frequency is used as an address information, a Fourier transform-based filter method, for example a discrete FFT filter method, may be applied in order to detect whether an upstream ECC channel between the central network device 35 and the respective receiver and transmitter device 27 is included in the electrical receive signal. The electrical receive signal that has been created by the respective receive unit $29_{RX}$ may be supplied to the respective controller 37 of the receiver and transmitter device 27. The controller may include a suitable analog or digital hardware realizing the electrical filter which is required to extract the upstream ECC signal from the electrical receive signal. Of course, instead of providing a separate filter hardware, the controller 37 may comprise a central processing unit (CPU) which is configured to execute a digital filtering method according to a suitable software or firmware.

If the controller 37 detects that the pilot tone frequency which has been assigned to the respective receiver and transmitter device 27 is present in the electrical receive signal, the controller may further evaluate any other information included in the respective pilot tone. This information may comprise any characteristic property of the pilot tone, for example the (constant) amplitude of the pilot tone. The information may further comprise time variant properties of the pilot tone, especially information transported by the pilot tone by means of an arbitrary modulation of the pilot tone.

The information included in an upstream ECC channel may be further processed by the controller 37, for example to create an information which is to be transmitted in a downstream ECC channel between the respective receiver and transmitter device 27 and the central network device 35.

In order to establish a downstream ECC channel between a receiver and transmitter device 27 and the central network device 35, the controller 37 may control the transmitter unit $29_{TX}$ in an appropriate way. For example, the transmitter unit $29_{TX}$ may be controlled in such a way that, in addition to the (high-frequency) modulation component, the downstream optical channel signal $DS_{CHi}$ further comprises a low-frequency modulation component, which may again be realized as a low-frequency pilot tone. The pilot tone frequency may be dedicated to the respective receiver and transmitter device 27. In order to simplify the assignment of pilot tones for the upstream and downstream ECC channels, the pilot tone frequency can be assigned to a specific receiver and transmitter device 27 and may be identical for the upstream ECC and the downstream ECC (in case the upstream ECC uses dedicated pilot tone frequencies).

In the embodiment shown in FIG. 1, the central network device 35 includes an optical receiver device 47 to which the downstream optical WDM signal $DS_{WDM}$ is supplied by means of an optical 1×2 splitter 49, which is inserted in the optical path between the WDM port 31a of the optical multiplexer 31 and the variable optical attenuator 39. The optical 1×2 splitter is designed in such a way that only a small portion, for example 1 to 10%, of the optical power of the downstream optical WDM signal $DS_{WDM}$ is split off from the optical WDM transmission path 3 and supplied to the optical filter device 47. The optical receiver device 47 comprises an optical filter 51, for example an etalon/Fabry-Pérot interferometer, having a periodic transfer function revealing periodic peaks at an essentially constant (optical) frequency distance. This frequency distance may be identical with the frequency distance of the downstream optical channels defined by the optical multiplexer 31, which may be realized as an AWG. The frequency grid of the optical filter 51 may be shifted as compared to the frequency grid defined by the optical multiplexer 31. In this way, a variation of the optical center wavelength of a downstream optical channel signal $DS_{CHi}$ may be detected with a higher sensitivity if the optical center wavelength lies within a mid-range of the respective downstream optical channel defined by the optical multiplexer 31.

The optical receiver device 47 further comprises an opto-electrical conversion means, for example at least one photodiode. The opto-electrical conversion means may be configured in such a way that an electrical low-pass filtering is additionally carried out with respect to the electrical signal received. At any rate, the optical receiver device 47 creates an electrical signal including information concerning the position of the center wavelength of the downstream optical channel signals $DS_{CHi}$ within the downstream optical channel. Especially, the amplitude of the respective pilot tone can be interpreted as a measure of the accuracy of a desired center position of the center wavelength of the respective downstream optical channel signal $DS_{CHi}$ within the respective downstream optical channel.

The optical filter 47 may also be realized in the form of a wave locker as described for example in EP 2 642 676 A1 or EP2 773 056 A1.

The controller 45 of the central network device 35 receives the electrical signal created by the optical receiver device 47 and extracts the desired information, especially an absolute or relative amplitude of the pilot tone comprised by each downstream optical channel signal $DS_{CHi}$. As explained above with respect to the detection of the upstream ECC signal(s) in the receiver and transmitter devices 27, the detection or extraction of the desired information included in these downstream ECCs may be effected by using electrical bandpass filters for each of the downstream pilot tones. These (electrical) filters may be comprised by the controller 45, wherein the filters may be realized as analog or digital hardware or software filters. Especially, the controller 45 may apply a Fourier transform-based filter method, for example a discrete FFT filter method, on the electrical signal received from the optical filter device 47.

Further, the controller 45 may additionally process the information detected in one or more or all of the downstream ECC signals and create an information that is to be transmitted to one or more or all of the receiver and transmitter devices 27 of the OLT 7. As explained above, the controller 45 creates a corresponding modulation signal comprising one or more pilot tones and supplies this modulation signal to the broadband optical source 41.

In this way, a bidirectional communication using a plurality of upstream ECCs and a plurality of downstream ECCs can be established. If an optical receiver device 47 is used in the central network device, especially if the optical receiver device 47 is realized as a wave locker, the ECC communication may be used to control tunable lasers included in the transmitter unit $29_{TX}$ with respect to their center wavelength and/or optical power.

The central network device 35 according to the embodiment of an optical WDM transmission system 1 further comprises means 53 for establishing downstream and upstream ECCs between the central network device 35 and the ONUs 13. These means may be realized as described in EP 2 773 056 A1 and are therefore only briefly described in the following.

In order to establish upstream ECCs between one, more or all of the ONUs 13 and the central network device 35, a specific pilot tone may be assigned to each of the ONUs. The controller 21 of an ONU 13 may control the transmitter unit $19_{TX}$ in such a way that the pilot tone is included as a low-frequency modulation component in the upstream optical channel signal $US_{TX}$. Of course, as explained above, the pilot tone may serve as a sub-carrier in order to include additional analog or digital information in the respective upstream ECC.

The means 53 comprise an optical receiver device 55 and a controller 57, which provide essentially the same functionality as the optical receiver device 47 and the controller 45 of the means 40. Thus, in this respect, reference is made to the above description concerning the ECCs between the central network device 35 and the OLT 7.

Generally, the optical receiver device 55 and the controller 57 are configured to identify whether or not one or more upstream ECCs are present in the upstream optical WDM signal $US_{WDM}$ or the upstream optical channel signals $US_{CHi}$, respectively. As explained above, this identification may be effected by detecting the presence of corresponding pilot tones, which are dedicated to the ONUs 13. If the pilot tones are detected after having optically filtered these signals, the absolute or relative amplitude of a pilot tone may be interpreted as a measure for the position of the center frequency of the respective upstream optical channel signal $US_{CHi}$ within the dedicated upstream optical channel. Of course, as described above, each pilot tone may further include additional information if the pilot tone is used as a sub-carrier, which is modulated according to a modulation signal including the further information.

One or more downstream optical ECCs between the central network device and the ONUs 13 are realized by supplying a modulation signal $S_{VOA}$ to the VOA 39, which acts as an optical modulator device for modulating the optical power of the downstream optical WDM signal $DS_{SDM}$. The VOA 39 adds a low-frequency modulation component to the downstream optical WDM signal $DS_{WDM}$ according to the modulation signal $S_{VOA}$. The modulation signal $S_{VOA}$ may be created as a low bit rate digital signal comprising the desired information. In this case, the digital signal may comprise digital address information in order to establish one or more downstream ECCs to corresponding selected ONUs 13.

Alternatively, the modulation signal $S_{VOA}$ may comprise pilot tones having unique frequencies dedicated to the ONUs 13. In this case, the presence of a pilot tone having a dedicated frequency may be interpreted as address information in the ONUs 13. The pilot tones may serve as modulated sub-carriers in this alternative, too.

As apparent from FIG. 1, the optical receiver device 55 receives, at an input port, the upstream optical WDM signal $US_{WDM}$ comprising the upstream optical channel signals $US_{CHi}$, which comprise the respective upstream ECC signals as a modulation component. In order to supply the upstream optical WDM signal $US_{WDM}$ to the optical receiver device 55, a 1×2 optical splitter 59 is inserted in the optical path between the band port of the optical separator/combiner means 16, at which the upstream optical WDM signal $US_{WDM}$ is output, and the WDM port of the optical demultiplexer 33. It is of course sufficient to split off a rather low power portion of the upstream optical WDM signal $US_{WDM}$, for example a portion in the range of 1 to 10%. In this way, an acceptable low attenuation caused by the 1×2 optical splitter 59 is achieved.

As the 1×2 optical splitter 59 is inserted in the optical path between the band port of the optical separator/combiner means 16 and the WDM port of the optical demultiplexer 33 (in the direction of the signal transmission) before the optical combiner 43, an identical or partially overlapping set of pilot tone frequencies can be used for the upstream ECC signals between the ONUs 13 and the central network device 35 and the upstream ECC signals between the central network device 35 and the OLT 7, even if the broadband optical signal $S_{BR}$ covers the same optical band that is used by the upstream optical channel signals $US_{CHi}$. If, as explained as an alternative above, the broadband optical signal $S_{BR}$ is created outside this optical band (for example, in a higher order of a cyclic AWG, which realized the optical demultiplexer 33), the same pilot tones could be used for both sets of upstream ECCs, even if the optical 1×2 splitter 59 is provided at a position (in the direction of the signal transmission) after the position of the optical combiner 43, provided that the wavelength band that is used by the upstream optical channel signals $US_{CHi}$ is blocked by the optical receiver device 55.

It would also be possible to split off the upstream optical WDM signal $US_{WDM}$ at a position within the optical fiber 15, which guides both the upstream and the downstream optical WDM signals $US_{WDM}$ and $DS_{WMD}$. The only disadvantage of this alternative is that the attenuation of the splitter 59 causes an attenuation of the downstream optical WDM signal $DS_{WDM}$, too.

However, the advantage of positioning the splitters and combiners 43, 49 and 59 and even the VOA 39 within the optical path that is used for both the upstream and downstream optical WDM signals $US_{WDM}$ and $DS_{WDM}$ is that the central network device 35 (or at least one of the means for establishing downstream and upstream ECCs 40 and 53) can be positioned at an arbitrary distance from the OLT 7, as the optical separator/combiner means 16 for separating the optical paths for the upstream and downstream optical WDM signals will usually be provided at the OLT.

Figure 2:
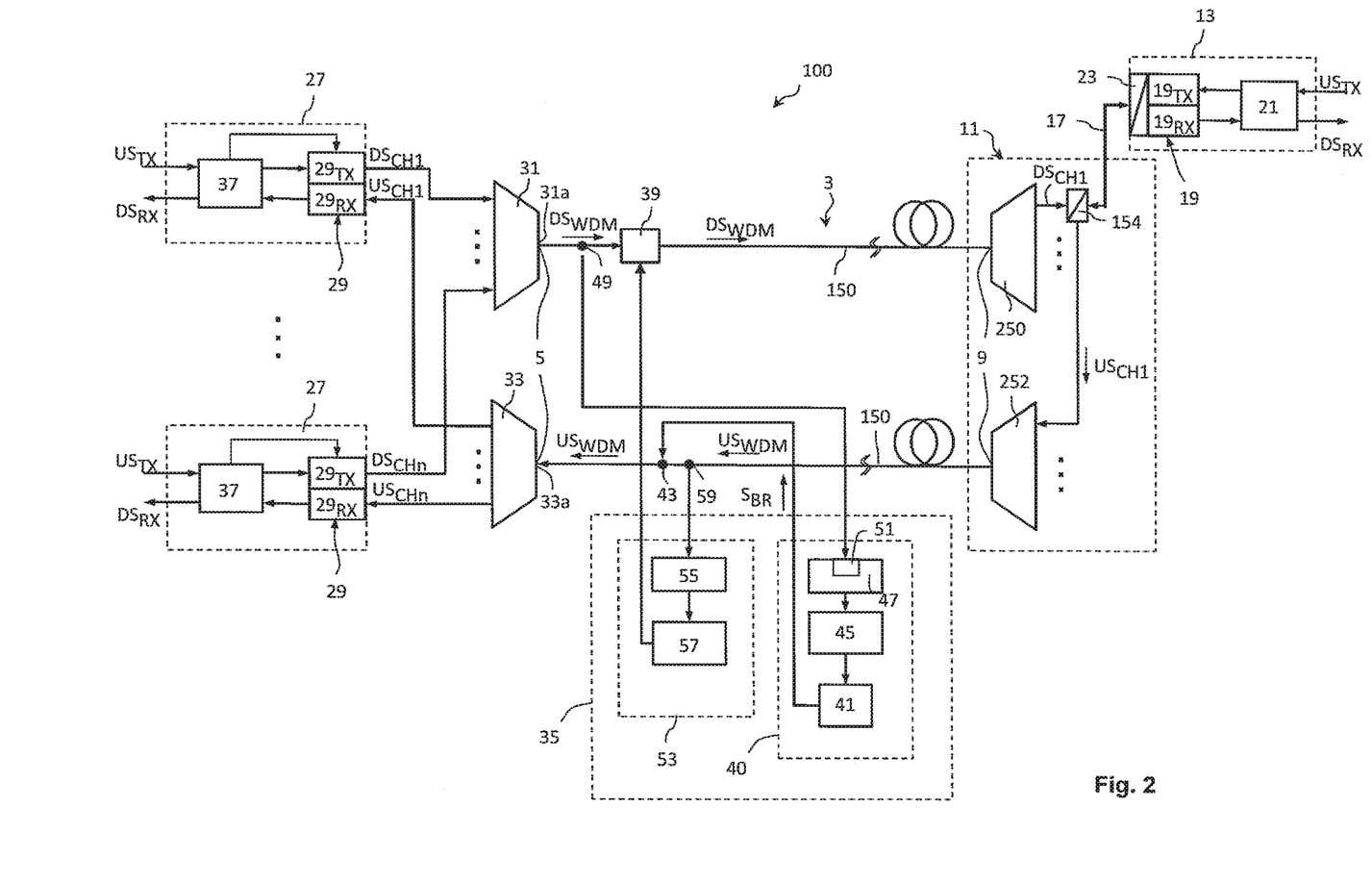
FIG. 2 shows a schematic block diagram of a second embodiment of an optical WDM transmission system comprising a dual-fiber optical WDM transmission path.
Figure 3A:
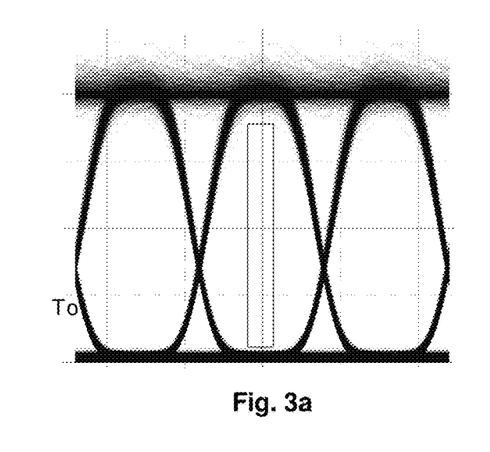
FIGS. 3a-3b show an eye diagram (FIG. 3a) for a 1 GbE (gigabit Ethernet) transmission over an optical WDM channel using an optical WDM transmission system according to FIG. 1 or 2 and a pilot tone trace (FIG. 3b), both detected at a channel transceiver, the ratio of the power of the optical channel signal and the (optically filtered) broadband optical signal being 16 dB.
Figure 3B:
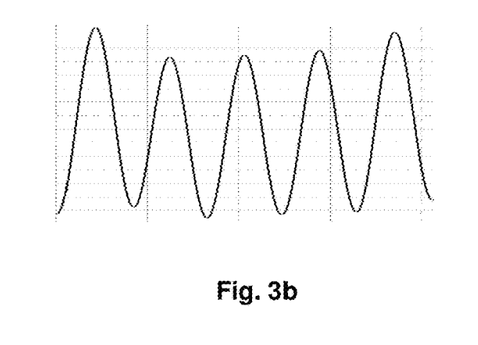
Figure 4A:
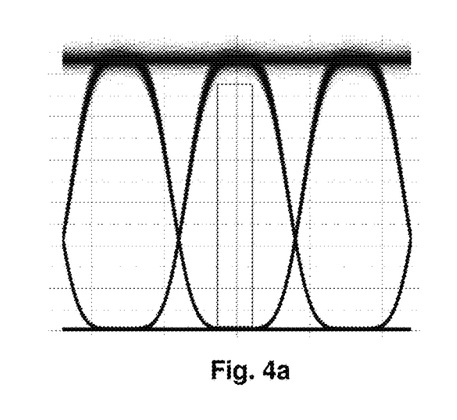
FIGS. 4a-4b show an eye diagram (FIG. 4a) and a pilot tone trace (FIG. 4b) according to FIGS. 3a-3b, the ratio of the power of the optical channel signal and the (optically filtered) broadband optical signal being 21 dB.
Figure 4B:
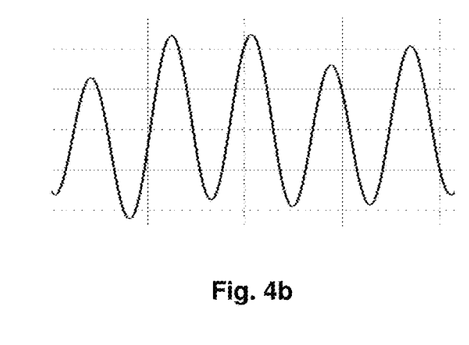
Figure 5A:
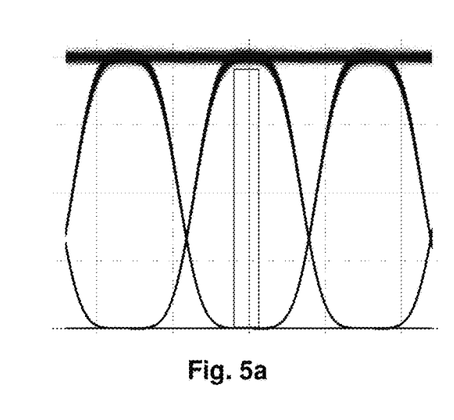
FIGS. 5a-5b show an eye diagram (FIG. 5a) and a pilot tone trace (FIG. 5b) according to FIGS. 3a-3b, the ratio of the power of the optical channel signal and the (optically filtered) broadband optical signal being 26 dB.
Figure 5B:
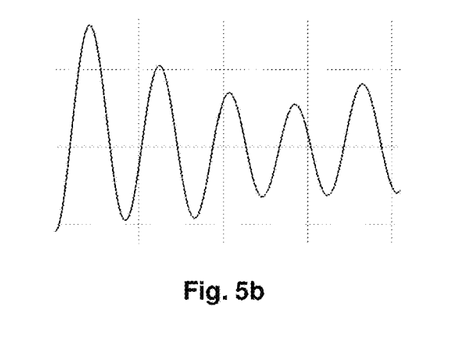

FIG. 2 shows a second embodiment of an optical WDM transmission system 100 similar to the system 1 according to FIG. 1 which, however, differs from the system in FIG. 1 in that the optical transmission path 3 comprises a separate optical fiber 150 for the downstream direction for guiding the downstream optical WDM signal $DS_{WDM}$ and a separate optical fiber 152 for the upstream direction for guiding the upstream optical WDM signal $US_{WDM}$. Thus, no optical separator/combiner means is required at the OLT 7 for separating/combining the optical paths for the upstream and downstream optical signals $US_{WDM}$, $DS_{WDM}$. The remote node 11 for this system 100 requires a more complex structure as each of the ONUs 13 shall still be connected to the remote node 11 by a single optical fiber 17. Thus, the remote node 11 according to FIG. 2 comprises a plurality of optical separator/combiner means 154, for example optical diplexers, wherein each of these optical separator/combiner means 154 has a downstream port, which is connected to a dedicated channel port of an optical demultiplexer 250, for example an AWG, an upstream port, which is connected to a dedicated channel port of an optical multiplexer 252, for example a further AWG, and a WDM port, which is connected to a respective end of the respective optical fiber 17. A WDM port of the optical demultiplexer 25 is connected to the second end of optical WDM transmission path 3, that is, the respective end of the optical fiber 150. Likewise, a WDM port of the optical multiplexer 252 is connected to the respective end of the optical fiber 152.

In this embodiment, the VOA 39, which must be provided within the optical path for guiding the downstream optical WDM signal $DS_{WDM}$, is provided within the optical path realized by the optical fiber 150. The same applies to the optical 1×2 splitter 49 for splitting off a desired power portion of the downstream optical WDM signal $DS_{WDM}$ and supplying this signal to the means for establishing downstream and upstream ECCs 40 between the OLT 7 and the central network device 35.

As explained above in connection with the system 1 according to FIG. 1, it might be advantages to provide the splitter 49 (in the direction of the signal transmission) before the VOA 39 if an identical or partially overlapping set of pilot tone frequencies shall be used for the downstream ECCs between the OLT 7 and the central network device 35 and the downstream ECCs between the central network device 35 and the ONUs 13.

In order to establish the desired upstream and downstream ECCs between the OLT 7 and the central network device 35, the optical combiner 43 and the 1×2 optical splitter 59 are provided within the optical path of the optical fiber 152 for guiding the upstream optical WDM signal $US_{WDM}$.

If an identical or partially overlapping set of pilot tone frequencies shall be used for the upstream ECCs between the central network device 35 and the OLT 7 and the upstream ECCs between the ONUs 13 and the central network device 35, the 1×2 optical splitter 59 must be positioned (in the direction of the signal transmission) before the optical combiner 43, at least if the broadband optical signal $S_{BR}$ covers or overlaps the optical wavelength band used for the upstream optical channel signals $US_{Chi}$. As already explained above, the order of positioning the optical combiner 43 and the optical splitter 59 within the optical path of the fiber 152 may be reversed, either if different sets of pilot tone frequencies are used or if the broadband optical signal $S_{BR}$ is created outside the optical band that is used for upstream optical channel signals $US_{Chi}$ and if the optical band of the broadband optical signal $S_{BR}$ is optically blocked by the means 53.

Apart from the differences between the system 1 according to FIG. 1 and the system 100 according to FIG. 2, the above description of the functionality of the system 1 analogously applies to the system 100.

FIGS. 3a-5b show eye diagrams of an upstream optical channel signal $US_{CHi}$, in the form of a 1 Gb Ethernet signal received at an input port of a receiver unit $29_{RX}$ of a transceiver 29 comprised by the OLT 7 (FIG. 3a to FIG. 5a) and pilot tone traces of a pilot tone having a pilot tone frequency of for example 1 MHz (FIG. 3b to FIG. 5b) comprised by the respective optical channel signal $US_{Chi}$. The eye diagrams have been simulated by applying an (electrical) filter bandwidth of 3 GHz. The pilot tone traces have been simulated by applying an electrical filter bandwidth of 5 MHz. An optical demultiplexer 33 in the form of an AWG having an optical channel bandwidth of 100 GHz has been assumed for carrying out the simulation. The ratio of the optical power of the upstream optical channel signal $US_{CHi}$ and the optical power of the broadband optical signal $S_{BR}$ filtered by the AWG is 16 dB, 21 dB and 26 dB for the signals shown in FIGS. 3a-3b, FIGS. 4a-4b, and FIGS. 5a-5b, respectively. As apparent from FIGS. 3a-3b, even in this case of a relatively poor power ratio the eye is still sufficiently open to receive the signal by applying a direct detection method.

Thus, as apparent from the above description, the invention makes it possible to implement an upstream ECC by using a central network device comprising a broadband optical source which creates a broadband optical signal covering an optical bandwidth of at least a group or all upstream optical channel signals. The broadband optical signal is chosen in such a way that a respective optically filtered broadband optical signal can be received by a respective receiver unit of a channel transceiver which is connected to a dedicated channel port of the optical demultiplexer (which optically filters the broadband optical signal).

The central network device may be connected to the optical WDM transmission path at an arbitrary position. As a specific application, the central network device may be used for tuning a tunable optical source, for example a tunable laser, which is comprised by the transmitter unit of a channel transceiver. Of course, the method according to the invention may be used to implement an ECC in the direction of an arbitrary end of the optical WDM transmission path, that is, for example, in the direction of an OLT or an ONU.

The ECC signal created by using the broadband optical source can be received easily, for example by tapping off an electrical signal from the electrical receive signal created in the respective receiver unit and by low-pass filtering this signal. Both signals, that is, the upstream optical channel signal and the respective ECC signal, may be detected using the same opto-electrical converter. The broadband optical source can be modulated in such a way that a modulation index of up to 100% is achieved so that a low output power, for example 0 dBm, is sufficient for an error-free detection. Even if the broadband optical signal is created in the same band as used by the upstream optical channel signals, the influence, especially a noise-like crosstalk, on the high speed upstream signal is relatively low due to the very low signal power of the broadband optical signal.

LIST OF REFERENCE SIGNS 1 optical WDM transmission system
3 optical WDM transmission path
5 first end
7 OLT
9 second end
11 remote node 13 ONU
15 optical fiber (of the WDM transmission path)
16 optical separator/combiner means
17 optical fiber (distribution fiber)
19 channel transceiver
$19_{TX}$ transmitter unit
$19_{RX}$ receiver units
21 controller
23 optical separator/combiner means
25 AWG
27 receiver and transmitter device
29 channel transceiver
31 optical multiplexer
31a WDM port
33 optical demultiplexer
33a WDM port
33 WDM port
35 central network device
37 controller
39 VOA
41 broadband optical source
40 means for establishing downstream and upstream ECCs (OLT—central network device)
43 optical combiner
45 controller
47 optical receiver device
49 optical 1×2 splitter
51 optical filter
53 means for establishing downstream and upstream ECCs (central network device —ONUs)
55 optical receiver device
57 controller
59 1×2 optical splitter
100 optical WDM transmission system
150 optical fiber
152 optical fiber
154 optical separator/combiner means
250 optical demultiplexer
252 optical multiplexer
$DS_{WDM}$ downstream optical WDM signal
$US_{WDM}$ upstream optical WDM signal
$DS_{Chi}$ downstream optical channel signal (1≤i≤n)
$US_{Chi}$ upstream optical channel signal (1≤i≤n)
$DS_{RX}$ downstream receive signal
$DS_{TX}$ downstream transmit signal
$US_{RX}$ upstream receive signal
$US_{TX}$ upstream transmit signal
$S_{BR}$ broadband optical signal
$S_{VOA}$ modulation signal

The invention claimed is:

1. A method for establishing an embedded optical communication channel in an optical wavelength division multiplexing (WDM) transmission system, the optical WDM transmission system comprising a plurality of first channel transceivers at a first end of a bidirectional optical WDM transmission path, a plurality of second channel transceivers at a second end of the bidirectional optical WDM transmission path and a central network device connected to the bidirectional optical WDM transmission path, each first channel transceiver being configured to create and transmit a first optical channel signal, in a respective downstream channel, to the second end of the bidirectional optical WDM transmission path and to receive a second optical channel signal created by a second channel transceiver and each second channel transceiver being configured to create and transmit a second optical channel signal, in a respective upstream channel, to the first end of the bidirectional optical WDM transmission path and to receive a first optical channel signal created by a first channel transceiver, the method comprising:

(a) creating, at the central network device, a broadband optical signal having an optical spectrum which covers at least a group of neighboring or all optical upstream channels of the optical WDM transmission system, the optical power of the broadband optical signal being modulated according to a low-frequency modulation signal in such a way that there is no or no unacceptable spectral overlap of the low-frequency spectrum of the low-frequency modulation signal and the modulation spectra of the second optical channel signals;

(b) supplying the broadband optical signal, at a predefined position between the first and the second end, to the bidirectional optical WDM transmission path in the direction of the first end thereof;

(c) transmitting the broadband optical signal and the plurality of second optical channel signals, if any, to an optical demultiplexer device, which is connected to the first end of the bidirectional optical WDM transmission path and which optically filters and spatially separates the incoming optical signals according to optical channel bandwidths predefined for the optical WDM transmission system;

(d) transmitting, from the optical demultiplexer device to each of the plurality of channel transceivers, an optical signal consisting of a dedicated second optical channel signal, if any, and a filtered broadband optical signal;

(e) receiving, at each first channel transceiver, the optical signal and creating a corresponding electrical receive signal comprising a second electrical channel signal corresponding to the dedicated second optical channel signal and an electrical signal corresponding to the filtered broadband optical signal; and (f) extracting, at each first channel transceiver, the electrical signal corresponding to the filtered broadband optical signal from the electrical receive signal and detecting whether the electrical signal contains information intended for the respective first channel transceiver.

2. The method according to claim 1, wherein the broadband optical signal is created by means of a broadband optical source.

3. The method according to claim 1, wherein a modulation depth is between 80 percent and 100 percent.

4. The method according to claim 1, wherein at least one of the plurality of first channel transceivers comprises a tunable laser, that a predetermined portion of the optical power of the first optical channel signals is split off at a predetermined position of the bidirectional optical WDM transmission path, that control information included in the respective at least one first optical channel signal is determined and that the broadband optical signal is created in such a way that the control information and an address information are included in its low-frequency amplitude modulation component.

5. The method according to claim 4, wherein the at least one first channel signal comprises a low-frequency amplitude modulation component comprising a unique pilot tone assigned to the respective optical channel of the optical WDM transmission system.

6. The method according to claim 2, wherein the low-frequency amplitude modulation component of the broadband optical signal is created by using, as a modulation signal for amplitude-modulating the broadband optical source, at least one unique pilot tone, which is modulated according to a digital signal carrying the information to be transmitted.

7. The method according to claim 6, wherein a frequency of the at least one pilot tone is assigned to a selected optical upstream channel of the optical WDM transmission system.

8. The method according to claim 6, wherein a frequency of the at least one pilot tone is assigned to all optical upstream channels of the optical WDM transmission system.

9. The method according to claim 8, wherein the at least one pilot tone is modulated using a low bit rate digital signal, which comprises a digital address information, which is evaluated by the first channel transceivers.

10. A central network device for establishing an embedded optical communication channel in an optical WDM transmission system, the optical WDM transmission system comprising a plurality of first channel transceivers at a first end of a bidirectional optical WDM transmission path and a plurality of second channel transceivers at a second end of the bidirectional optical WDM transmission path, each first channel transceiver being configured to create and transmit a first optical channel signal, in a respective downstream channel, to the second end of the bidirectional optical WDM transmission path and to receive a second optical channel signal created by a second channel transceiver and each second channel transceiver being configured to create and transmit a second optical channel signal, in a respective upstream channel, to the first end of the bidirectional optical WDM transmission path and to receive a first optical channel signal created by a first channel transceiver, the central network device comprising:
   (a) a broadband optical source configured to create a modulated broadband optical signal having an optical spectrum which covers at least a group of neighboring or all optical upstream channels of the optical WDM transmission system, the optical power of the modulated broadband optical signal being amplitude-modulated according to a low-frequency modulation signal, wherein the low-frequency spectrum of the low-frequency modulation signal reveals no or no unacceptable spectral overlap with the baseband spectra of the second optical channel signals;
   (b) a controller configured to create and/or receive the low-frequency modulation signal and to supply same to the broadband optical source; and
   (c) an optical combiner device configured to receive, at a first optical port, the second optical channel signals, if any, and at a second optical port, the modulated broadband optical signal, and to output, at a third optical port, the signals received at the first and second optical ports.

11. The central network device according to claim 10, wherein the broadband optical source comprises a broadband electro-optical converter, which is directly modulated, or that the broadband optical source comprises a broadband electro-optical converter and an external optical modulator configured to modulate the broadband optical signal created by the broadband electro-optical converter.

12. The central network device according to claim 10, wherein the central network device further comprises an opto-electrical converter configured to receive an optically filtered or unfiltered downstream optical WDM signal comprising the first optical channel signals and to convert the signal received into an electrical WDM signal and to supply the electrical WDM signal to the controller.

13. The central network device according to claim 12, wherein the controller is configured to determine an embedded information included in at least one first electrical channel signal that corresponds to a respective first optical channel signal comprised in the optically filtered or unfiltered optical downstream WDM signal and to create the low-frequency modulation signal in such a way that it includes the embedded information determined or an information that is determined by processing the embedded information.

14. An optical WDM transmission system comprising
   (a) a plurality of first channel transceivers at a first end of a bidirectional optical WDM transmission path, a plurality of second channel transceivers at a second end of the bidirectional optical WDM transmission path; and
   (b) a central network device connected to the bidirectional optical WDM transmission path,
   (c) wherein each first channel transceiver is configured to create and transmit a first optical channel signal, in a respective downstream channel, to the second end of the bidirectional optical WDM transmission path and to receive, via an optical demultiplexer device, which is connected to the first end of the bidirectional optical WDM transmission path and which optically filters and spatially separates the incoming optical signals according to optical channel bandwidths predefined for the optical WDM transmission system, a second optical channel signal created by a second channel transceiver and
   (d) wherein each second channel transceiver is configured to create and transmit a second optical channel signal, in a respective upstream channel, to the first end of the bidirectional optical WDM transmission path and to receive a first optical channel signal created by a first channel transceiver,
   wherein:
   (e) the central network device comprises a broadband optical source, which is configured to create a broadband optical signal the power of which is amplitude-modulated according to a low-frequency modulation signal,
   (f) the optical spectrum of the broadband optical signal covers at least a group of neighboring or all optical upstream channels of the optical WDM transmission system, the optical power of the broadband optical signal being modulated according to the low-frequency modulation signal in such a way that there is no or no unacceptable spectral overlap of the low-frequency spectrum of the low-frequency modulation signal and any of the modulation spectra of the second optical channel signals,
   (g) the central network device comprises a controller configured to create and/or receive the low-frequency modulation signal and to supply same to the broadband optical source,
   (h) that the central network device comprises an optical combiner device configured to receive, at a first optical port, the second optical channel signals, if any, and at a second optical port, the modulated broadband optical signal, and to output, at a third optical port, the signals received at the first and second optical ports in the direction of the optical demultiplexer device, and
   (i) at least one of the first channel transceivers is configured:
      (i) to receive, from the demultiplexer device, an optical signal consisting of a dedicated second optical channel signal, if any, and a filtered broadband optical signal,
      (ii) to convert the optical signal into a corresponding electrical receive signal comprising a second electrical channel signal corresponding to the dedicated second optical channel signal and an electrical signal corresponding to the filtered broadband optical signal, and (iii) to extract the electrical signal from the electrical receive signal and detect whether the electrical signal contains information intended for the respective first channel transceiver.

15. The optical WDM transmission system according to claim 14, wherein the at least one first channel transceivers comprises a tunable laser, that a predetermined portion of the optical power of the first optical channel signals is split off at a predetermined position of the bidirectional optical WDM transmission path by an optical splitter, that the central network device is configured to determine control information included in the respective at least one first channel signal and to create the broadband optical signal in such a way that the control information and an address information are included in its low-frequency amplitude modulation component.

16. The method according to claim 2, wherein the broadband optical source comprises an electro-optical converter, wherein the electro-optical converter is directly modulated.

17. The method according to claim 16, wherein the electro-optical converter is a light emitting diode or a super continuum laser.

* * * * *